3,205,085
SODIUM CARBOXYMETHYLCELLULOSE MODIFIED TiO₂ PIGMENT AND PROCESS OF MAKING SAME
Lionel J. Bailin, Wilmington, Del., assignor to E. I. du Pont de Nemours and Company, Wilmington, Del., a corporation of Delaware
No Drawing. Filed Aug. 25, 1961, Ser. No. 133,786
7 Claims. (Cl. 106—300)

This application is a continuation-in-part of my co-pending prior application Serial No. 11,966, filed March 1, 1960, and now abandoned.

This invention relates to a titanium dioxide pigment composition. More particularly, it relates to a titanium dioxide pigment which is especially suitable for use in the manufacture of paper.

Titanium pigments are probably the best known of the white pigments, and they have been used for many years in the papermaking industry to impart brightness and opacity to paper products. These pigments have been used in surface treatments of paper, and they have also been incorporated into paper itself during the papermaking process. The procedure for incorporating titanium dioxide into paper is much the same as it is with other pigments and filler which are used as constituents in paper. Such materials are usually added to the pulp at the machine called the beater. The beater usually consists of an oval tub, wherein a rotating roll with crosswise iron knives presses the watery pulp down and rubs it against a bed plate. The beating process conditions the pulp for the actual papermaking process, this latter step being accomplished on machines referred to in the trade as "Fourdriniers." Many chemicals to be incorporated into paper are usually added at the beater since its action serves to intermix such chemicals with the pulp. After the beating operation, additional water is added to the pulp to form a mixture which is referred to as "stuff." This diluted mixture may be further conditioned by passing through pulp "refiners" which cut and shear the fibers. It is then flowed onto the wire mesh belt of the Fourdrinier machine. This wire mesh belt moves away from the flow of pulp and water, and it also shakes from side to side to settle the fibers on the wire. The white water in the stuff falls through the wire mesh, leaving most of the solids in the stuff on the wire mesh in the form of a wet paper. However, many papermakers find that when titanium dioxide is used in the pulp system, there is a tendency for much of this material to be carried off in the white water. This loss is accentuated when starch is used in the pulp system. The starch appears to exert a dispersing action upon the titanium dioxide pigment, thus causing poor retention in the paper. Such a dispersing action can also be caused by other chemicals added during the papermaking process. Another disadvantage of titanium dioxide addition to paper pulps is the excessive amount of dusting of the pigment that takes place when the formed sheet is run through rolls such as calender rolls or offset printing rolls.

It is the object of the present invention to provide an improved titanium dioxide pigment composition having improved retention properties when incorporated into a paper pulp system. It is another object of this invention to provide a titanium dioxide pigment which will be retained in paper when the latter is run through the rolls of calender machines or printing presses. It is a still further object of this invention to provide a process for producing such an improved pigment.

The objects of this invention are attained by a pigment composition comprising an impact-milled mixture of titanium dioxide and an alkali salt of carboxymethylcellulose in a minor amount sufficient to improve the retentiveness of the titanium dioxide in paper.

Alkali salts of carboxymethylcellulose which may be used in the pigment of this invention include the sodium, potassium, lithium, and ammonium salts of carboxymethylcellulose. The amount of carboxymethylcellulose salts in the impact-milled pigment of this invention will usually be in the range of about 0.5%–10% by weight of the finished pigment. Amounts below 0.5% can also be used, but they are less effective. On the other hand, amounts in excess of 10% are also operable, but economic considerations usually prohibit the use of such quantities. A preferred range for the carboxymethylcellulose salt is 1.5%–3% by weight. Sodium carboxymethylcellulose is a preferred material.

The pigment of this invention can be prepared in standard milling equipment. Suitable mills include ring-roller mills, hammer mills, swing-hammer mills, squirrel cage disintegrators, ball, rod, or tube mills, fluid energy mills, pan-type mills such as a chaser mill, and the like. A preferred milling apparatus for preparing the pigment of this invention is a swing hammer mill of the type described in the working examples.

For a clearer understanding of the invention, the following specific examples are given. These examples are intended to be merely illustrative of the invention and not in limitation thereof. Unless otherwise specified, all parts are by weight.

EXAMPLE I

Anatase titanium dioxide prepared by hydrolysis of a titanium sulfate solution, followed by washing of the hydrolysate, and calcination at about 900° C. in a continuous calciner was dry ground at a rate of 2350 pounds per hour in a 50-inch ring-roller mill equipped with an air separation system. The discharge from the air separation system was fed to a continuous blending system comprised of automatic weighing vibrating feeder by means of which the high-molecular-weight sodium carboxymethylcellulose (CMC) was being introduced at a rate of 48 pounds per hour into the titanium dioxide pigment stream being fed to a bin above a 24-inch swing-hammer mill. The CMC was in dry pulverulent form, and had a degree of substitution of 0.7 to 0.8, and exhibited a viscosity of 1800 cp. in a 1% water solution. The uniformly blended mixture was then fed at 2400 pounds per hour to the swing-hammer mill which is equipped with a backing screen having 3/16 inch round perforations. The finely pulverulent product from the swing-hammer mill was analyzed and contained 2% by weight of sodium carboxymethylcellulose. It was tested for retentiveness in paper pulp by the following procedures:

(a) *Preparation of pigment-pulp suspension.*—Five hundred milliliters of an aqueous suspension containing 0.5% by weight (based on water) of bleached sulfite fiber which had been beaten to a freeness of 32° (Schopper-Reigler) and 9.4% by weight (based on fiber) of chlorinated starch ("CLAR-O" starch) and 6.5% by weight (based on fiber) of the modified titanium dioxide pigment was stirred for 10 minutes to disperse the pigment. Two percent by weight (based on fiber) of papermaker's alum $Al_2(SO_4)_3 \cdot 18H_2O$ was added to adjust the pH to 4.5–5.5 in order to fluocculate the pulp-pigment system.

(b) *Paper formation test for pigment retention (this invention).*—Circular test papers were prepared by pouring 200 milliliters of the above suspension through a 100-mesh screen, 3½ inches in diameter, immediately after a period of agitation. The resultant paper when analyzed by ashing contained 4.93% $TiO_2$ (bone dry basis), which is equivalent to a retention of 76%.

(c) *Paper formation test for pigment retention (control).*—For comparison, the same titanium dioxide pigment was hammer-milled as described, but sodium carboxymethylcellulose was not used. When this pigment was used in paper and tested according to procedures (a) and (b), the paper sheet contained 2.03% TiO₂. This is equivalent to a retention of 31%.

(d) *Short test—Filtrate turbidity.*—The filtrates from the paper formation tests (b) and (c) were checked visually, and on a Bausch and Lomb comparison type colorimeter (Model Spectronic 20 Colorimeter, #33–29–40) to give a turbidity reading at a wave length of 562 millimicrons as a measure of relative retentiveness of the pigment in the fiber. A 1:1 dilution of 20 mls. of the filtrate in deionized water was placed in the 6-inch comparison cell, and transmittance read as follows:

| Filtrate from paper formation tests (b) and (c) above | Visual reading (no dilution) | Percent transmittance |
| --- | --- | --- |
| (b) This invention | Filtrate very slightly cloudy (indicated good retentiveness). | 32 |
| (c) Control | Filtrate very cloudy (indicated poor retentiveness). | Too opaque to read. Dilution of 1:18 was required to obtain same transmittance as above. |

EXAMPLE II

Anatase titanium dioxide, prepared and dry ground in a ring-roller mill as in Example I, was blended with several types of sodium carboxymethylcellulose as set forth below. This blend was then passed through a swing-hammer mill at a rate equivalent to that used in Example I to produce pigment compositions of this invention.

To further show that these impact-milled pigments behave differently from blended mixtures of the same materials, viscosity determinations were made (using a "Brookfield Synchro-Lectric Viscometer" operating at 100 r.p.m., utilizing a #4 spindle) on water suspensions of such pigments and on similar water suspensions of uniformly blended mixtures of the same TiO₂ and CMC at temperatures of 25° C. From the data given below, it will be seen that the viscosity of the impact-milled pigment was considerably less than that of the corresponding blended mixture.

TABLE I

| Type of CMC | Percent CMC by wt. | Viscosity of water suspension of unmilled mixture of TiO₂ and CMC (25% by wt. of mixture) c.p. | Viscosity of water suspension of pigment of this invention (25% by wt. of pigment) c.p. | Spindle |
| --- | --- | --- | --- | --- |
| High Viscosity CMC* | 1.5 | 195 | 140 | 3 |
| Do | 2.0 | 346 | 260 | 3 |
| Do | 2.5 | 646 | 412 | 3 |
| Do | 3.0 | 1420 | 920 | 4 |
| Do | 4.0 | 3020 | 2108 | 5 |

*Viscosity alone in H₂O=1325 c.p. as 1% by wt. soln. (Brookfield Viscometer, #3 spindle, 30 r.p.m.)
Degree subst.=0.82
Degree polymerization=2000 (approx.)

TABLE II

| Type of CMC | Percent CMC by wt. | Viscosity of water suspension of unmilled mixture of TiO₂ and CMC (37.5% by wt. of mixture) c.p. | Viscosity of water suspension of pigment of this invention (37.5% by wt. of pigment) c.p. | Spindle |
| --- | --- | --- | --- | --- |
| Medium Viscosity CMC* | 2.0 | 620 | 435 | 3 |
| Do | 3.0 | 2400 | 2180 | 5 |

*Viscosity alone in H₂O=475 c.p. as 2% by wt. soln. (Brookfield Viscometer, #2 spindle, 30 r.p.m.)
Degree subst.=0.84
Degree polymerization=1000 (approx.)

TABLE III

| Type of CMC | Percent CMC by wt. | Viscosity of water suspension of unmilled mixture of TiO₂ and CMC (37.5% by wt. of mixture) c.p. | Viscosity of water suspension of pigment of this invention (37.5% by wt. of pigment) c.p. | Spindle |
| --- | --- | --- | --- | --- |
| Low Viscosity CMC* | 2.0 | 245 | 175 | 3 |
| Do | 3.0 | 1200 | 1160 | 4 |

*Viscosity alone in H₂O=25–50 c.p. as 2% by wt. soln. (Brookfield Viscometer, #1 spindle, 60 r.p.m.)
Degree subst.=0.80
Degree polymerization=500 (approx.)

Additional tests on pigment retention (a) *Lab scale test.*—As a further test for retentiveness in paper, the pigment of this invention (prepared by the procedure of Example I and containing 2% of the high viscosity CMC having a viscosity of 1325 cp. in H₂O as a 1% solution, a degree of polymerization of 2000 (approx.), and a degree of substitution of 0.82 was incorporated into a pulp suspension by adding the components to a vessel in the following order while agitation was maintained:

(1) 500 ml. of 0.5% bleached sulfite fiber (percent based on water)
(2) 2.5 ml. of 2.5% oxidized starch solution (2.5% starch based on fiber)
(3) 1.25 ml. of 2% alum solution (1% alum based on fiber) and stir 5 minutes
(4) 0.179 gram TiO₂ pigment (containing 2% CMC) and stir 10 minutes
(5) 1.25 ml. of 2% alum solution (1% alum based on fiber).

All percentages are by weight.

The mixture thus prepared was poured upon a 100-mesh screen 3½ inches in diameter. The filtrate which passed through the screen was checked on a turbidimeter and compared with a control pigment to determine the relative amount of TiO₂ which was lost in the white water. The control pigment was a blended mixture of the same material in the same proportions, the only difference being that the CMC and TiO₂ were not hammer-milled together. This control pigment was made up into a pulp suspension with the same ingredients and in the same manner as was used with the pigment of this invention.

The results obtained when the filtrates were checked on the turbidimeter were as follows:

Percent transmittance
Pigment of this invention _____ 77
Control _____ 32

(b) *Plant scale application.*—Bleached sulfite paper pulp of 4–5% consistency at the beater was used to make 70-pound paper (ream—25″ x 38″—500) pigmented with 7% TiO₂ and 10% clay. The water used to make up the pulp contained recycled white water. Oxidized starch varying between 2 and 6% was present in the beater over a 10-hour test period along with rosin and alum. The modified titanium dioxide pigment of this invention containing 2% sodium carboxymethylcellulose was used in a trial run. Total retention of titanium dioxide in the paper sheet averaged 90%. The dusting usually obtained at the calender rolls was not obtained during the test period.

EXAMPLE III

Starting with the same ring-roller milled pigment as used in Example II, 2724 grams was blended with 56 grams of sodium carboxymethylcellulose. The sodium carboxymethylcellulose was the same high viscosity type, as described in Example II, Table I. The mixture was rotated in a twin-shell dry blender for 20 minutes and then fed into a laboratory size (8 inch dia.) fluid energy mill (described as "Jet Pulverizer," Chem. Engineers' Handbook, pp. 1930–31, 1941 edition) at a rate of 1000 grams per minute, using superheated steam (241° C.) as the energizing fluid. The steam was discharged from the mill at 140° C. The treated pigment so made was tested and compared with that made in Example II, Table I, containing 2% CMC. It was also compared with water-dispersing $TiO_2$ pigment made without sodium carboxymethylcellulose. It will be seen from the data presented below that testing conditions involved the use of higher percentages of oxidized starch and alum than used in Example II.

Paper formation test for pigment retention was made by pouring 200 ml. pigment-pulp mixture through 100-mesh screen on a 3½-inch diameter circular funnel. The sheets so made were oven dried, then converted to ash to determine pigment retention. The pigment-pulp slurries used were formulated as follows:

(A) ONE-HALF ALUM ADDED BEFORE PIGMENT, ONE-HALF FOLLOWING

Step (1)—1 liter 0.55% bleached sulfite pulp.
Step (2)—Add 10 mls. 2.5% oxidized starch solution (4% on pulp), stir 5 minutes.
Step (3)—Add 2.7 mls. 2% alum solution (1% on pulp), stir 5 minutes.
Step (4)—Add 0.385 g. pigment (7% based on pulp, 6.57% based on final paper), stir 10 minutes.
Step (5)—Add 2.75 mls. 2% alum solution (1% on pulp), stir 5 minutes.

(B) TOTAL ALUM ADDED AFTER PIGMENT

Step (1)—1 liter 0.55% bleached sulfite pulp.
Step (2)—Add 10 mls. 2.5% oxidized starch solution (4% on pulp), stir 5 minutes.
Step (3)—Add 0.385 g. pigment (7% on pulp; 6.57% on final paper), stir 10 minutes.
Step (4)—Add 5.5 mls. 2% alum (2% on pulp), stir 5 minutes.

TABLE IV

| Pigment used | Percent $TiO_2$ retained when ½ of alum is added before pigment | Percent $TiO_2$ retained when alum is added after pigment | Viscosity of water suspension of pigment (25% by wt. of pigment) c.p. |
| --- | --- | --- | --- |
| Water dispersing grade $TiO_2$ (No CMC added) | 15 | 22 | 15 |
| Swing-hammer milled $TiO_2$-CMC mixture (Example II, 2% high viscosity CMC) | 32 | 66 | 260 |
| Fluid energy milled $TiO_2$-CMC mixture (Example III, 2% high viscosity CMC) | 32 | 61 | 150 |

EXAMPLE IV

A sample of anatase pigment, calcined and dry ground, similar to that used in Example I, was treated by mixing in a dry blender with 2% of dry sodium carboxymethylcellulose. This agent had a molecular weight in the 300,000 to 500,000 range, a degree of substitution of 0.42, and a viscosity of 500 cp. in 1% aqueous solution. The blended mixture was then dry impact milled by passing through micropulverizer. A 25% (wgt.) aqueous slurry of the milled pigment had a viscosity of 82 cp.

One liter of 0.5% bleached sulfite paper pulp was placed in a vessel equipped with an electric stirrer. The stirrer was operated while the following additions to the paper pulp were made:

(1) 5 ml. of a 2.5% starch solution ("Clar-O" starch);
(2) After 2 minutes, 2.75 ml. of a 2% solution of papermakers' alum $[Al_2(SO_4)_3 \cdot 18H_2O]$;
(3) After 2 minutes, 0.5 g. of the CMC-treated anatase described above in this example;
(4) After 10 minutes, 2.75 ml. of the alum solution used in Step 2 was added, and the stirring was continued for another 5 minutes.

Test sheets were prepared from this pulp, and by analysis of them it was found that a 53% retention of the $TiO_2$ was obtained whereas another pulp, identical except for the CMC, gave only a 16% retention.

From the data which has been presented, it is apparent that the pigment of this invention exhibits an unexpectedly high degree of retentiveness in paper. It is believed that this retentiveness is due to the fact that the impact milling causes the carboxymethylcellulose salt to be adsorbed on the titanium dioxide pigment particles and when such a pigment is incorporated in paper pulp systems, the presence of the adsorbed CMC on the $TiO_2$ particles tends to exert a preferential bonding between the pigment and the pulp fiber. This preferential bonding is so strong that it overcomes the action of starch which interferes with the retention of titanium dioxide pigments in pulp fibers.

Pigmentary titanium dioxide suitable for use in the process of the invention may be either anatase or rutile. Either of these crystal forms may be produced by the well known sulfate process for the production of $TiO_2$, or by vapor phase oxidation of titanium halides. The finishing steps in these processes include wet or dry milling to develop the desired pigment qualities. These milling operations commonly include a hammer mill type or fluid energy type of impact grinding to insure proper fineness of the final pigment. Blending of the alkali carboxymethylcellulose before the titanium dioxide is subjected to the final impact milling step is a convenient and effective means of carrying out the process of the invention. On the other hand, completely finished titanium dioxide pigment may be utilized, if desired, although such use may incur slightly higher cost of production due to the fact that additional impact grinding is required to cause adsorption of the alkali carboxymethylcellulose on the titanium dioxide particle surfaces. Either operation will insure that the alkali carboxymethylcellulose is in a suitable particle size for adsorption on the titanium dioxide. In the latter operation, where the alkali salt of carboxymethylcellulose is impact milled with a finished titanium dioxide pigment, one can determine optimum milling rate or time by comparing the viscosity of aqueous suspensions of the milled mixture with the viscosity of similar suspensions containing unmilled blends of the same materials as shown in Example II.

Many pieces of milling apparatus which exert an impact type of milling action will also blend the titanium dioxide and the carboxymethylcellulose salt into a uniform product. For example, a ball mill will simultaneously blend and impact mill these materials. However, with other types of milling apparatus, it may be desirable to obtain a uniform blend prior to milling. This can be accomplished in any of a number of ways. For example, one may use a circulating system, rotating pan type mixer with offset blades, tumbling barrels, cones, and the like.

The pigment of this invention is prepared from dry starting materials. Both titanium dioxide and alkali carboxymethylcellulose usually absorb small amounts of water from the atmosphere. Such small amounts of moisture are expected to be present in the materials used in this invention. It should be realized that although the pigment of this invention is prepared from dry starting materials, it is possible and practical to prepare such a pigment in a fluid energy mill energized by dry steam; i.e., super-heated steam. In such mills, the end product is always recovered in the dry state. It should also be pointed out that temperatures during the process for preparing pigment should never be so high as to yellow or char the carboxymethylcellulose.

Alkali salts of carboxymethylcellulose are synthetic polymers derived from cellulose, and they are usually formed by the reaction of alkali cellulose with monochloroacetic acid. Theoretically, the polymer may contain up to three alkali carboxymethyl groups per anhydroglucose unit, which would be equivalent to a degree of substitution of 3.0. The preferred material, sodium carboxymethylcellulose, is commercially available in a number of grades. Most of these commercially available grades are designated as being water-soluble and are suitable for use in the pigment of this invention. The term "water soluble" is used in the broad sense to include colloidal solutions. Such materials vary with respect to degree of substitution, degree of polymerization, molecular weight, and ability to increase the viscosity of aqueous systems. The simplest means of identifying or describing the various grades is in terms of the degree of substitution and the viscosity of 1% or 2% water solutions, as determined on the Brookfield Synchro-Lectric Viscometer. This viscometer is the one that is in general use by the manufacturers of these products. The grades of sodium carboxymethylcellulose suitable for use with pigmentary titanium dioxide in accordance with this invention usually have a molecular weight of about 100,000 to 700,000, and they include the low-viscosity types exhibiting viscosities from 10 to 100 cp. in water solutions of 2% by weight; the medium-viscosity types exhibiting viscosities of about 200–800 cp. in 2% by wgt. water solution; and the high-viscosity types exhibiting viscosities of 1000–5000 cp. in 1%-by-weight water solutions. In general, sodium carboxymethylcellulose suitable for the process has a degree of substitution within the range of .3 to 1.5, and a viscosity of within about 10 cp. for 2%-by-weight water solution to 5000 cp. for 1%-by-weight water solution. The preferred type of sodium carboxymethylcellulose has a degree of substitution (D.S.) in the range of 0.40 to 0.85 and a viscosity in 1%-by-weight water solution of from about 200 cp. for the lower D.S. material to about 2800 cp. for the high D.S. material, depending upon the molecular weight of the base cellulose. When using CMC prepared from a high-molecular-weight material, such as cotton, the viscosity of such a CMC will be higher than a CMC having the same degree of substitution but prepared from a lower-molecular-weight cellulose material. The most preferred material is sodium carboxymethylcellulose having a D.S. of 0.40–0.55 and a viscosity in a 1% water solution of 200–800 centipoises. Titanium dioxide treated with these most preferred materials shows the best pigment retention and opacifying efficiency. In addition, water slurries of TiO$_2$ pigment treated with the most preferred type of CMC have a lower viscosity than those treated with CMC of a higher D.S. This is a distinct advantage in the paper mill since it makes possible easier pumping of higher concentrations of pigment in water when the slurry is transferred from make-up location to the beater.

The modified titanium dioxide pigment of this invention provides a new and improved pigment for use in the manufacture of paper and paperboard and in other systems wherein titanium dioxide is dispersed in an aqueous medium during its use. In particular, it is a pigment of improved retentiveness in paper pulp systems wherein oxidized starches or other dispersants and alum are present when the sheet is formed. A further advantage of the new pigment is that paper containing this pigment does not dust under the action of calendering rolls, thus providing clean and trouble-free operation of the paper-making machinery. Still another advantage is that paper made with this pigment has improved printability over paper made with ordinary titanium dioxide pigment.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for producing an improved titanium dioxide pigment comprising impact milling a dry mixture of titanium dioxide and about from 0.5 to 10% by weight, based on the mixture, of water-soluble sodium carboxymethylcellulose having a degree of substitution of 0.4 to .85.

2. A dry pigment composition prepared by a process of claim 1, said composition consisting essentially of titanium dioxide and about from 0.5 to 10% by weight, based on the total composition, of water-soluble carboxymethylcellulose adsorbed on the titanium dioxide particles, having a degree of substitution of 0.4 to .85.

3. A dry pigment composition prepared by a process of claim 1, said composition consisting essentially of titanium dioxide and about from 0.5 to 10% by weight, based on the total composition, of water-soluble sodium carboxymethylcellulose adsorbed on the titanium dioxide particles, said sodium carboxymethylcellulose having a degree of substitution of about 0.40 to 0.85 and a viscosity within the range of 200–2800 centipoises in a 1%-by-weight water solution.

4. The pigment of claim 3 wherein the sodium carboxymethylcellulose has a degree of substitution of about 0.40–0.55 and a viscosity within the range of 200–800 centipoises in a 1%-by weight water solution.

5. The pigment of claim 3 wherein the sodium carboxymethylcellulose is present in an amount of 1.5%–3% by weight.

6. A process for producing an improved titanium dioxide pigment comprising hammer milling a dry mixture of titanium dioxide and about from 0.5 to 10% by weight, based on the mixture, of water-soluble, sodium carboxymethylcellulose, having a degree of substitution of 0.4 to .85.

7. A process for producing an improved titanium dioxide pigment comprising fluid energy milling with superheated steam a dry mixture of titanium dioxide and about from 0.5 to 10% by weight, based on the mixture, of water-soluble sodium carboxymethylcellulose, having a degree of substitution of 0.4 to .85.

References Cited by the Examiner

UNITED STATES PATENTS

| | | | |
|---|---|---|---|
| 2,690,398 | 9/54 | Guertler et al. | 106—165 |
| 2,776,912 | 1/57 | Gregory | 106—193 |
| 2,783,158 | 2/57 | Entwhistle et al. | 106—165 |
| 2,949,397 | 8/60 | Werner et al. | 106—308 |

FOREIGN PATENTS

| | | |
|---|---|---|
| 848,406 | 7/39 | France. |

TOBIAS E. LEVOW, *Primary Examiner.*

JOHN H. MACK, *Examiner.*